(12) United States Patent
Thomas et al.

(10) Patent No.: US 8,699,709 B2
(45) Date of Patent: Apr. 15, 2014

(54) METHODS FOR OBTAINING AUTHENTICATION CREDENTIALS FOR ATTACHING A WIRELESS DEVICE TO A FOREIGN 3GPP WIRELESS DOMAIN

(75) Inventors: Shanthi Thomas, Carpentersville, IL (US); George Popovich, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 306 days.

(21) Appl. No.: 13/178,650

(22) Filed: Jul. 8, 2011

(65) Prior Publication Data

US 2013/0013923 A1  Jan. 10, 2013

(51) Int. Cl.
*H04L 9/08* (2006.01)

(52) U.S. Cl.
USPC ............................ 380/247; 380/255; 713/168

(58) Field of Classification Search
USPC .................................. 380/247, 255; 713/168
See application file for complete search history.

(56) References Cited

U.S. PATENT DOCUMENTS

| | | | | |
|---|---|---|---|---|
| 6,876,747 | B1 * | 4/2005 | Faccin et al. ................... | 380/247 |
| 6,967,177 | B1 | 11/2005 | May et al. | |
| 7,039,190 | B1 * | 5/2006 | Engwer et al. ................. | 380/270 |
| 7,181,012 | B2 * | 2/2007 | Arkko et al. ................... | 380/270 |
| 7,512,783 | B2 * | 3/2009 | Naghian et al. ................ | 713/155 |
| 7,529,933 | B2 * | 5/2009 | Palekar et al. ................. | 713/168 |
| 7,639,802 | B2 | 12/2009 | Gundavelli et al. | |
| 7,873,163 | B2 * | 1/2011 | Quick et al. ................... | 380/247 |
| 8,332,912 | B2 * | 12/2012 | Naslund et al. ................... | 726/3 |
| 2005/0097320 | A1 | 5/2005 | Golan et al. | |
| 2006/0182280 | A1 | 8/2006 | Laitinen et al. | |
| 2010/0190497 | A1 | 7/2010 | Pudney et al. | |
| 2013/0012165 | A1 | 1/2013 | Popovich et al. | |

FOREIGN PATENT DOCUMENTS

| | | |
|---|---|---|
| EP | 1701505 A1 | 9/2006 |
| WO | 2007139883 A2 | 12/2007 |
| WO | 2008016570 A1 | 5/2008 |

OTHER PUBLICATIONS

Georgios Kambourakis, et al. "Experimental Analysis of an SSL-Based AKA Mechanism in 3G-and-Beyond Wireless Networks"; Department of Information and Communication Systems Engineering, University of the Aegean, SAMOS, Greece; 25 Pages; 2004.

3GPP TS 33.401 V9.7.0; 3rd Generation Partnership Project; Technical Specification Group Services and System Aspects; 3GPP System Architecture Evolution (SAE); Security Architecture, Release 9; Jun. 2011; 106 Pages.

(Continued)

*Primary Examiner* — Krisna Lim
(74) *Attorney, Agent, or Firm* — Steven A. May

(57) ABSTRACT

A method for obtaining authentication credentials for attaching a wireless device to a foreign wireless domain in a 3rd Generation Partnership Project (3GPP) communication system, which includes: receiving an attach request message from the wireless device; and responsive to the attach request message, authenticating the wireless device and retrieving a set of authentication vectors, wherein the authentication vectors are for authenticating the wireless device to the foreign wireless domain. The method further includes encrypting the set of authentication vectors using a first security key of a home wireless domain of the wireless device. In addition, the method includes encrypting the first security key using a second security key of the foreign wireless domain and sending the encrypted set of authentication vectors and the encrypted first security key to the wireless device.

15 Claims, 8 Drawing Sheets

(56) References Cited

OTHER PUBLICATIONS

3GPP TS 33.102 V9.4.0; Section 6.3.4; 3rd Generation Partnership Project; Technical Specification Group Services and System Aspects; 3G Security; Security Architecture, Release 9; Dec. 2010; 72 Pages.

Tzeng Z-J, et al. "Authentication of Mobile Users in Third Generation Mobile Systems"; Wireless Personal Communications, Springer, Dordrecht, NL. vol. 16, No. 1, Jan. 2001 pp. 35-50, XP001001045, ISSN; 0929-6212, DOI:10.1023/A:1026530706019.

Guangsong Li et al. "A Novel Localized Authentication Protocol in 3G-WLAN Integrated Networks", E-Business and E-Goverment (ICEE), 2010 International Conference on, IDDD, Piscataway, NJ, May 7, 2010, pp. 1285-1288, XP031767367, ISBN:978-0-7695-3997-3.

3rd Generation Partnership Project; Technical Specification Group Services and System Aspects; 3G Security; Access Security FO Rip-Based Services (Release 11), 3GPP TS 33.203, 3rd Generation Partnership Project(3GPP), Mobile Competence Centre; 650, Route Des Lucioles; F-06921 Sophia-Antipolis Cedex; France No. V11.0.0, Dec. 30, 2010, pp. 1-114 XP050462482.

International Search Report and Written Opinion for International Patent Application No. PCT/US2012/045186 issued on Oct. 30, 2012.

International Search Report and Written Opinion for related International Patent Application No. PCT/US2012/045185 mailed on Oct. 1, 2012.

Non Final Office Action mailed on Nov. 2, 2012 in related U.S. Appl. No. 13/178,612, George Popovich, filed Jul. 8, 2011.

Notice of Allowance mailed on Oct. 3, 2013 in related U.S. Appl. No. 13/178,612, George Popovich, filed Jul. 8, 2011.

Niemi, A., et al., "Hypertext Transfer Protocol (HTTP) Digest Authentication Using Authentication and Key Agreement (AKA)," Network Working Group, RFC 3310, Sep. 2002, 17 pages.

Dierks, T., et al., "The Transport Layer Security (TLS) Protocol Version 1.2," Network Working Group, RFC 5246, Aug. 2008, pp. 1-104.

Rescorla, E., et al., "Datagram Transport Layer Security," Network Working Group, RFC 4347, Apr. 2006, pp. 1-25.

Phelan, T., "Datagram Transport Layer Security (DTLS) over the Datagram Congestion Control Protocol (DCCP)," Network Working Group, RFC 5238, May 2008, pp. 1-10.

Kaufman, C., et al., "Internet Key Exchange Protocol Version 2 (IKEv2)," Internet Engineering Task Force (IETF), RFC 5996, Sep. 2010, pp. 1-138.

3rd Generation Partnership Project; Technical Specification Group Services and System Aspects; General Packet Radio Service (GPRS) enhancements for Evolved Universal Terrestrial Radio Access Network (E-UTRAN) access (Release 10) 3GPP TS 23.401 V10.2.1 (Jan. 2011), pp. 1-276.

3rd Generation Partnership Project; Technical Specification Group Services and System Aspects; 3G Security; Security architecture (Release 10) 3GPP TS 33.102 V10.0.0 (Dec. 2010), pp. 1-72.

\* cited by examiner

METHODS FOR OBTAINING AUTHENTICATION CREDENTIALS FOR ATTACHING A WIRELESS DEVICE TO A FOREIGN 3GPP WIRELESS DOMAIN

REFERENCE TO RELATED APPLICATIONS

The present application is related to the following U.S. applications commonly owned together with this application by Motorola Solutions, Inc.:

Ser. No. 13/178,612, filed Jul. 8, 2011, titled "Methods for Attaching a Wireless Device to a Foreign 3GPP Wireless Domain using Alternative Authentication Mechanism" by Popovich, et al., and published as U.S. patent application publication no. 2013/0012165.

TECHNICAL FIELD

The present disclosure relates generally to wireless communications and, in particular, to methods for obtaining authentication credentials for attaching a wireless device to a foreign wireless domain in a 3rd Generation Partnership Project (3GPP) communication system.

BACKGROUND

A 3GPP communication system often comprises numerous wireless networks (also interchangeably referred to herein as wireless domains), such as Long Term Evolution (LTE) networks, Universal Mobile Telecommunications System (UMTS) networks, Global System for Mobile Communications (GSM) networks, WiMax networks, etc (also referred to generally herein as 3GPP networks or 3GPP domains). Each 3GPP network includes one or more infrastructure devices, such as a Mobility Management Entity (MME) for instance, which provide connectivity, roaming, and other communication services to enable the communication of media to wireless devices (also interchangeably referred to herein as User Equipment (UE)). A wireless device is often associated with a designated wireless network. As used herein, the designated wireless network for the wireless device is termed a home wireless network (also interchangeably referred to herein as a home wireless domain, a home 3GPP wireless domain, and a home LTE wireless domain) to the wireless device. As mentioned above, a feature of the 3GPP communication system is roaming, which allows a wireless device to connect to wireless networks other than the home wireless network of the wireless device. As used herein, the wireless networks other than the home wireless network of the wireless device are termed as foreign wireless networks (also interchangeably referred to herein as foreign wireless domains, foreign 3GPP wireless domains, and foreign LTE wireless domains) to the wireless device.

As described in 3GPP standards, when a wireless device attaches (i.e., connects) to a foreign 3GPP wireless network, the foreign 3GPP wireless network attempts to authenticate and authorize the wireless device using a standard 3GPP authentication mechanism, which includes obtaining authentication credentials from the home 3GPP wireless network of the wireless device. To obtain such authentication credentials, the MME of the foreign wireless network contacts the Home Subscriber Servers (HSS) of the home wireless network through a standard 3GPP S6a interface.

In order to use the S6a interface, the foreign and home wireless networks must have a roaming agreement. However, such a roaming agreement requirement creates a scalability problem for the 3GPP communication system as the number of 3GPP domains in the system increases since roaming agreements between all of the networks would be required to achieve a fully meshed nation-wide network. Moreover, even in the presence of roaming agreements between wireless networks in the system, a communication link between two wireless networks may be broken or interrupted for various reasons, such as natural disasters. This would also prevent the foreign MME from obtaining the authentication credentials for the wireless device attempting to attach to the foreign 3GPP network.

Accordingly, there is a need for an alternative method for obtaining authentication credentials from the home wireless network in a 3GPP communication system.

BRIEF DESCRIPTION OF THE FIGURES

The accompanying figures, where like reference numerals refer to identical or functionally similar elements throughout the separate views, together with the detailed description below, are incorporated and form part of the specification and serve to further illustrate various embodiments of concepts that include the claimed invention, and to explain various principles and advantages of those embodiments.

Figure 1:
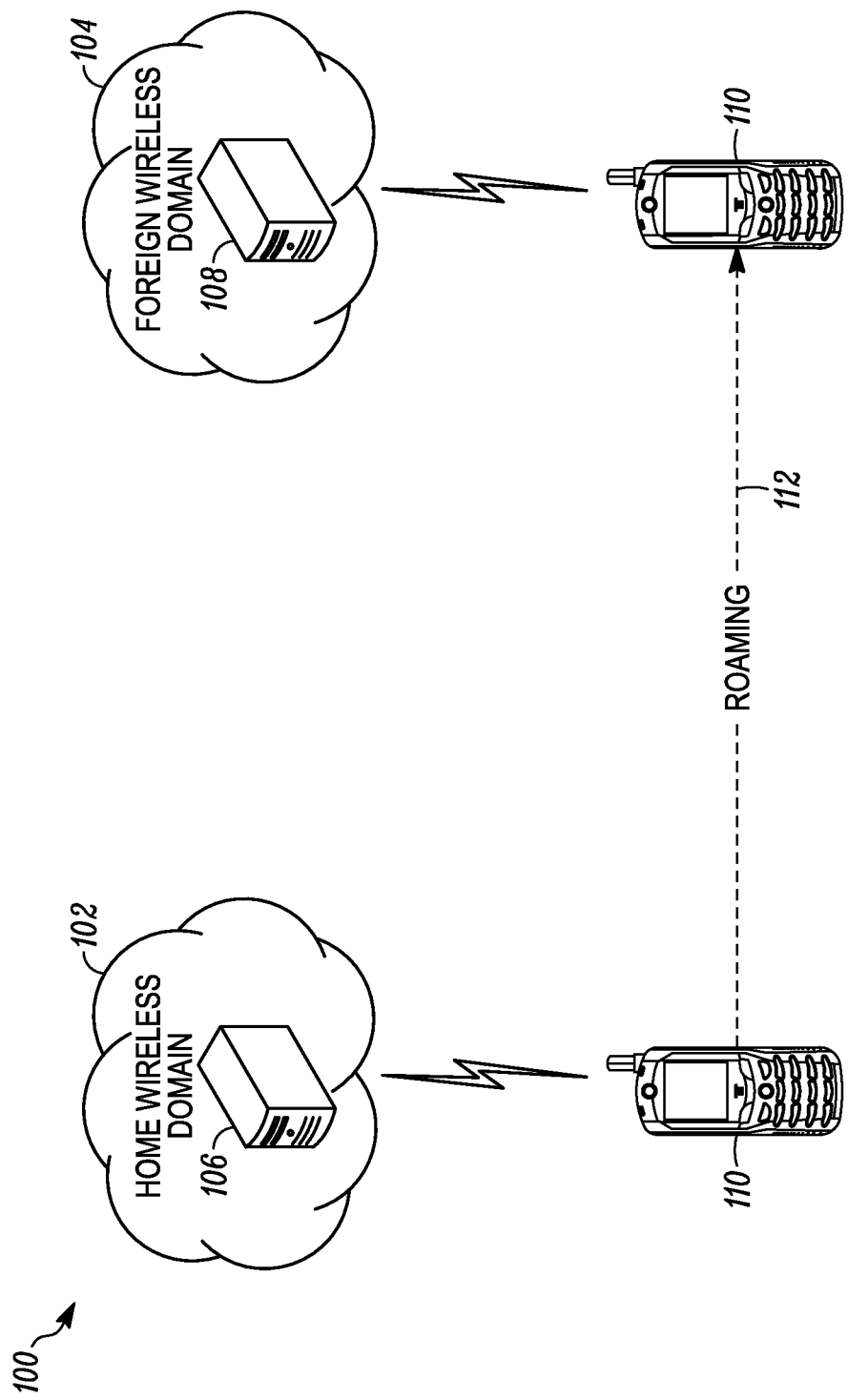
FIG. 1 illustrates a communication system implementing embodiments of the present teachings.

Skilled artisans will appreciate that elements in the figures are illustrated for simplicity and clarity and have not necessarily been drawn to scale. For example, the dimensions of some of the elements in the figures may be exaggerated relative other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a method for obtaining authentication credentials for attaching a wireless device to a foreign wireless domain in a 3rd Generation Partnership Project (3GPP) communication system. In accordance with the present teachings, a method performed by an infrastructure device within a home wireless domain of the wireless device includes receiving an attach request message from the wireless device and authenticating the wireless device and retrieving a set of authentication vectors in response to the attach request message. As used herein, a set means one or more; thus, a set of authentication vectors means one or more authentication vectors. The authentication vectors are for authenticating the wireless device to the foreign wireless domain using a standard 3GPP authentication mechanism. Additionally, the method includes encrypting the set of authentication vectors using a first security key of the home wireless domain, and encrypting the first security key using a second security key of the foreign wireless domain. Moreover, the method includes sending the encrypted set of authentication vectors and the encrypted first security key to the wireless device.

Further in accordance with the present teachings, a method performed by an infrastructure device in the foreign wireless domain includes receiving an attach request message from the wireless device. The attach request message includes an encrypted first security key of a home wireless domain of the wireless device and a set of encrypted authentication vectors for authenticating the wireless device using a standard 3GPP authentication mechanism. The set of encrypted authentication vectors is generated by the home wireless domain. The method further includes decrypting the encrypted first security key using a second security key of the infrastructure device, and decrypting the set of encrypted authentication vectors using the first security key. Moreover, the method includes authenticating the wireless device using at least one authentication vector in the set of authentication vectors.

Additionally, in accordance with the present teachings, a method performed by a user equipment includes sending an attach request message and a request for a set of authentication vectors to an MME in a home wireless network. The home wireless network is within a 3GPP communication system, and associated with the user equipment. The method further comprises receiving an encrypted set of authentication vectors and an encrypted security key of the home wireless network from the MME in the home wireless network after the home MME successfully authenticates the use equipment. The set of authentication vectors are encrypted using the security key. Moreover, the method includes sending an attach request message to an MME within a foreign wireless network in the 3GPP communication system.

Referring now to the drawings, and in particular FIG. 1, an illustrative 3GPP communication system implementing embodiments in accordance with the present teachings is shown and indicated generally at 100. System 100 comprises two wireless domains (also interchangeably referred to herein as wireless networks), a home wireless domain 102 and a foreign wireless domain 104. As defined herein, a domain or network is a grouping of infrastructure devices that serves as a "home domain" for a set of wireless devices, meaning that the domain at least controls and manages authentication credentials for access to the 3GPP communication system for wireless devices associated with or subscribed to that domain. All other domains within a 3GPP communication system that are not the home domain for a given wireless device are defined as "foreign domains" for the wireless device. Authentication credentials are defined herein as data used to verify identity of a wireless device or a user of a wireless device and includes, but is not limited to, data such as one or more authentication vectors, a username, a password, an International Mobile Subscriber Identity (IMSI), etc.

Accordingly, in the implementation scenario illustrated by reference to FIG. 1, wireless network 102 controls the authentication credentials of a wireless device 110, and is thus termed as a home wireless domain to the wireless device 110. To the contrary, wireless network 104 lacks control or knowledge of the authentication credentials of the wireless device 110 (unless such credentials are provided to wireless network 104 by the home network 102 or the wireless device 110, for instance), and is thus termed as a foreign wireless domain to the wireless device 110.

System 100 may comprise additional wireless networks (not shown) and wireless devices (not shown). In a typical implementation scenario, at least some of the wireless networks within the communication system 100 are owned or administered by different entities, for example different public safety entities. For instance, system 100 may include a public land mobile network (PLMN), such as for one or more police or fire departments, or a commercial LTE network, etc. Moreover, at least some of the wireless networks within the communication system 100 may not have a mutual roaming agreement. Wireless networks 102 and 104 include a number of infrastructure devices for facilitating communications for wireless devices. Such infrastructure devices may include, but are not limited to, bridges, switches, zone controllers, base station controllers, repeaters, base radios, base stations, base transceiver stations, gateways, home subscriber servers (HSS), Mobility Management Entities (MMEs), evolved NodeBs (eNodeBs), access points, routers or any other type of infrastructure equipment interfacing a communication device in a wireless environment, particularly a 3GPP wireless environment.

In this illustrative implementation, wireless communication system 100 is a 3GPP communication system having a plurality of wireless domains, e.g., the home wireless network 102 and the foreign wireless network 104 that are 3GPP wireless networks meaning that the networks have infrastructure devices whose operation is compliant with a suite of 3GPP Technical Specifications (TSs) also referred to herein as 3GPP standards. Further in accordance with this illustrative implementation, wireless networks 102 and 104 are LTE networks. Therefore, wireless network 102 comprises an MME infrastructure device 106 and a HSS (not shown), and wireless network 104 comprises an MME infrastructure device 108 and a HSS (not shown). Both network 102 and network 104 may comprise additional MME (not shown). MMEs provide functions related to connection management and bearer management. For example, an MME supports establishment of the connection and security between a wireless device and the LTE network in which the MME resides, and communication between an MME and a wireless device is via Non Access Stratum (NAS) protocols. The HSS manages real time subscriber information such as subscriber context and state. Moreover, although LTE networks are described herein, the teachings herein are not limited by the 3GPP network types shown or described herein but may be applied to other 3GPP wireless networks such as WiMax networks.

Both wireless networks 102 and 104 provide networking services for wireless devices, such as the wireless device 110. The wireless devices are also commonly referred to in the art as mobile devices, access devices, access terminals, mobile stations, mobile subscriber units, subscriber units, user devices, and the like. These communication devices can be any type of communication device such as radios, mobile phones, mobile data terminals, Personal Digital Assistants (PDAs), laptops, two-way radios, cell phones, etc.

As shown, the wireless device 110 is capable of connecting to both wireless networks 102 and 104. Wireless device 110 generally attaches to wireless network 102 using a standard 3GPP attach procedure comprising signaling as specified and described in the 3GPP standards. The standard 3GPP attach procedure enables a wireless network to connect to and authenticate wireless devices. The wireless devices are not allowed to use networking services of the wireless network unless the wireless devices are authenticated and the attach procedure is completed. Following the standard 3GPP attach procedure, the wireless device 110 sends MME 106 an attach request message, which is an initial message that starts the attach procedure. Generally, a wireless device communicates with an MME in a LTE network through an eNodeB device, which performs radio resource management, radio bearer control, connection mobility management, header compression, link encryption of the user data stream, packet routing, and other functions.

In response to this attach request message, MME 106 performs a standard 3GPP authentication mechanism meaning that the authentication mechanism (or process for authenticating) is as defined and described in the 3GPP standards, for example in 3GPP TSs 33.102 and 33.401, wherein the standard authentication mechanism uses Authentication and Key Agreement Protocol (AKA) as defined Internet Engineering Task Force (IETF) Request for Comments (RFC) 3310 dated May 20, 2002 (including previous or subsequent revisions). In accordance with the standard 3GPP authentication mechanism, the MME 106 retrieves authentication credentials for the wireless device 110 from another infrastructure device, such as the HSS (not shown) of wireless network 102. MME 106 communicates with the HSS of wireless network 102 via a standard 3GPP S6a interface. The authentication credentials include one or more authentication vectors that are sequentially ordered and are compliant with 3GPP TSs 33.102 and 33.401. Each authentication vector may contain a random number, an expected response, a cipher key, an integrity key, and an authentication token. One of the authentication vectors is then used by the MME 106 to authenticate and authorize the wireless device 110. To authenticate the wireless device 110, the MME 106 implements the AKA protocol. Upon successful authentication, the MME 106 sends wireless device 110 an attach accept message.

Oftentimes, wireless devices roam from one network to another network and demand the same or similar networking services from each network. Such interoperability between the networks is a beneficial feature of a 3GPP communication system since it enables a wireless device to communicate outside of its home wireless domain. For example, when wireless device 110 roams (represented as a dashed line 112 in FIG. 1) to wireless network 104, wireless device 110 attempts to attach to wireless network 104 by sending an attach request message to MME 108. In response to this attach request message, MME 108 determines that the home wireless network of wireless device 110 is wireless network 102, and then contacts (represented as a dashed line 114 in FIG. 1) MME 106 for authentication credentials for wireless device 110. Upon successful retrieval of authentication credentials from MME 106, MME 108 uses an authentication vector contained in the authentication credentials to authenticate and authorize wireless device 110 using the AKA protocol, in accordance with the standard 3GPP authentication mechanism. When MME 108 successfully authenticates wireless device 110, MME 108 sends wireless device 110 an attach accept message, which indicates successful connection of the wireless device 110 to wireless network 104.

However, MME 108 may fail to authenticate wireless device 110 for various reasons. For example, A HSS in the home wireless domain 102 may deny the request for authentication credentials from MME 108 due to a lack of a roaming agreement between the foreign wireless domain 104 and the home wireless domain 102. In another example, MME 108 may fail to connect to the HSS in the home wireless domain 102 due to a broken network link caused by natural disasters or other events. In this illustrative implementation, when MME 108 fails to authenticate wireless device 110 through the standard 3GPP authentication mechanism, embodiments of the present disclosure are performed to enable a wireless device to otherwise obtain the authentication vectors to authenticate to forward to the foreign wireless domain for use in authenticating the wireless device.

In general, the wireless devices 110 and infrastructure devices, such as MMEs 106 and 108, of wireless networks 102 and 104 of system 100 are implemented using one or more (although not shown) memory devices, network interfaces, and processing devices that are operatively coupled, and which when programmed form the means for these system elements to implement their desired functionality, for example, as illustrated by reference to the methods and message sequence diagrams shown in FIGS. 2-6.

The processing device utilized by the elements of system 100 may be partially implemented in hardware and, thereby, programmed with software or firmware logic or code for performing functionality described by reference to FIGS. 2-6; and/or the processing device may be completely implemented in hardware, for example, as a state machine or ASIC (application specific integrated circuit). The memory implemented by these system elements can include short-term and/or long-term storage of various information needed for the functioning of the respective elements. The memory may further store the software or firmware for programming the processing device with the logic or code needed to perform its functionality.

Figure 2:
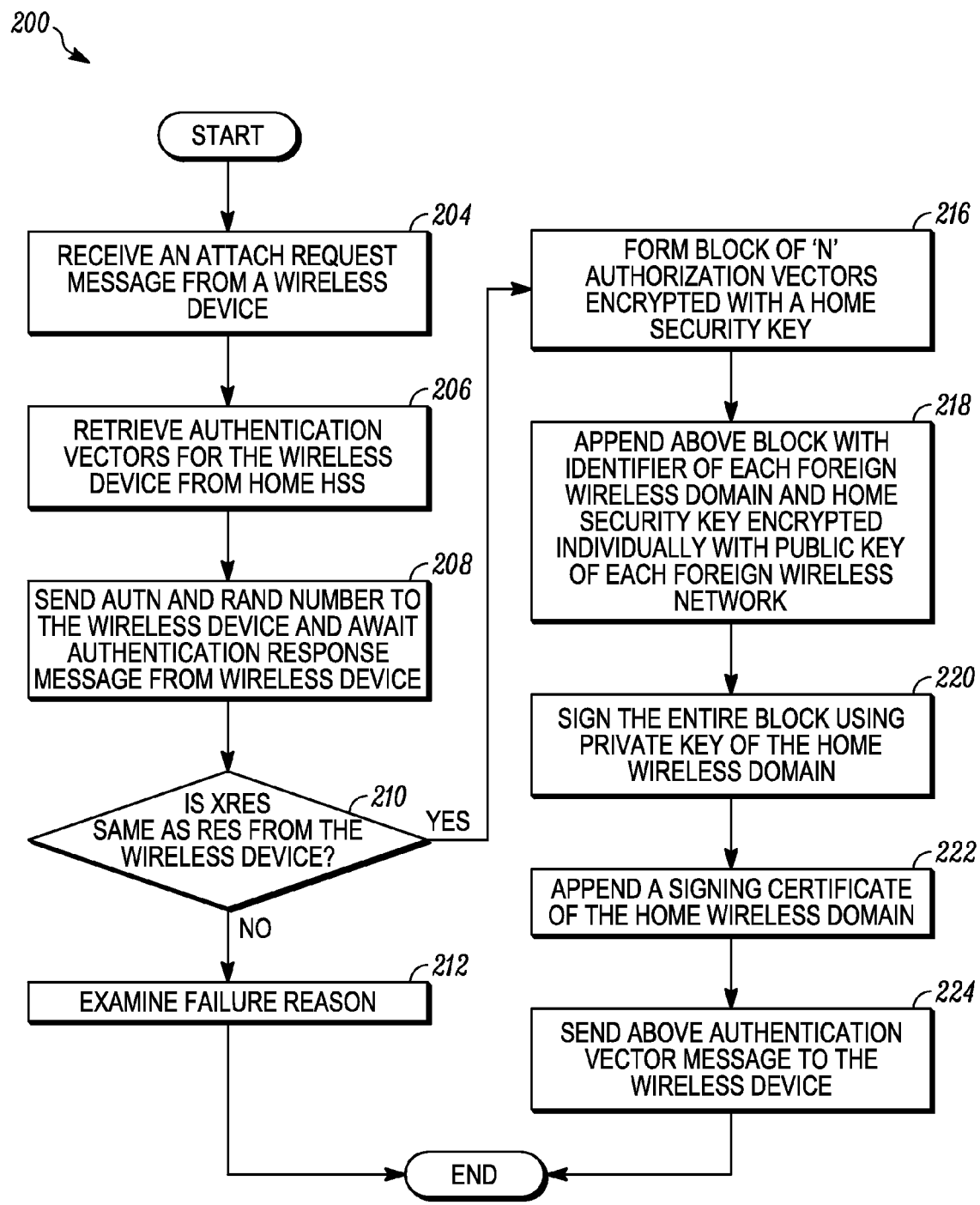
FIG. 2 is a logical flowchart illustrating a method in accordance with some embodiments.

We now turn to a detailed description of the functionality of the system 100 elements in accordance with the teachings herein and by reference to the remaining figures. FIG. 2 illustrates a logical flow diagram showing a general method 200 performed by an infrastructure device within a home wireless network of a wireless device. In a particular embodiment of FIG. 2, the wireless device is wireless device 110 of FIG. 1, the home wireless domain is LTE network 102 of FIG. 1, the infrastructure device is MME 106 of FIG. 1, and a foreign wireless domain is LTE network 104 of FIG. 1.

For purposes of this illustrative implementation, the infrastructure device (e.g., MME 106 in the home wireless network) is in a normal operational mode, waiting for requests from wireless devices and other network devices. In a 3GPP communication system, wireless devices perform a standard attach procedure to attach to a LTE network. At 204, the MME in the home wireless network receives an attach request message, which is part of the standard attach procedure, from the wireless device. In a particular embodiment of FIG. 2, the attach request message is sent after a Radio Resource Control (RRC) connection is established between the wireless device and an eNodeB of the foreign wireless network. In one embodiment, the attach request message is a standard 3GPP attach request message, as described in the 3GPP TSs, which indicates identification and security capabilities of the sending wireless device. For example, an International Mobile Subscriber Identifier (IMSI) of the wireless device is specified in the attach request message, which the foreign MME can use to identify the home domain of the wireless device. This can be done for instance using an IMSI to wireless network ID mapping table. Alternatively, the standard attach request message is modified to include an identifier of the home domain of the wireless device. Any suitable identifier can be included in the attach request message to identify the wireless device and/or its home domain.

The MME in the home wireless network determines identification of the wireless device and home wireless network of the wireless device based on identification information contained in the attach request message. After the MME in the home wireless network determines that this network is the home wireless network of the wireless device, the MME retrieves authentication credentials for authenticating the wireless device at 206. In a typical LTE network, the MME in the home wireless network retrieves authentication credentials, such as authentication vectors, for authenticating the wireless device to the LTE network, from an HSS of the same home wireless network.

Beginning at 208, the MME in the home wireless network authenticates the wireless device using the standard 3GPP AKA protocol. The MME in the home wireless network selects a first authentication vector from the authentication vectors retrieved at 206. Additionally, at 208, the MME in the home wireless network sends to the wireless device a random network challenge number (RAND), and a network authentication token (AUTN) for network authentication from the selected authentication vector. Thereafter, the MME in the home wireless network waits for an authentication response message from the wireless device at 208.

Responsive to the authentication response message received from the wireless device, at 210 the MME in the home wireless network checks whether a response (RES) in the authentication response message is the same as an expected response (XRES). If the RES is different from the XRES at 212, the MME in the home wireless network assumes that the wireless device is not authenticated successfully, and examines the reasons leading to the authentication failure. Turning back to 210, if the RES is same as the XRES, the MME in the home wireless network assumes that the wireless device is successfully authenticated, at 216. Additionally, at 216, the MME in the home wireless network determines whether an authentication vector message should be constructed based on capabilities of the wireless device. In one particular embodiment of method 200, the MME in the home wireless network maintains a database of capabilities of wireless devices. The MME in the home wireless network only constructs an authentication vector message, upon successful authentication, if the wireless device supports authentication vector message.

Figure 3:
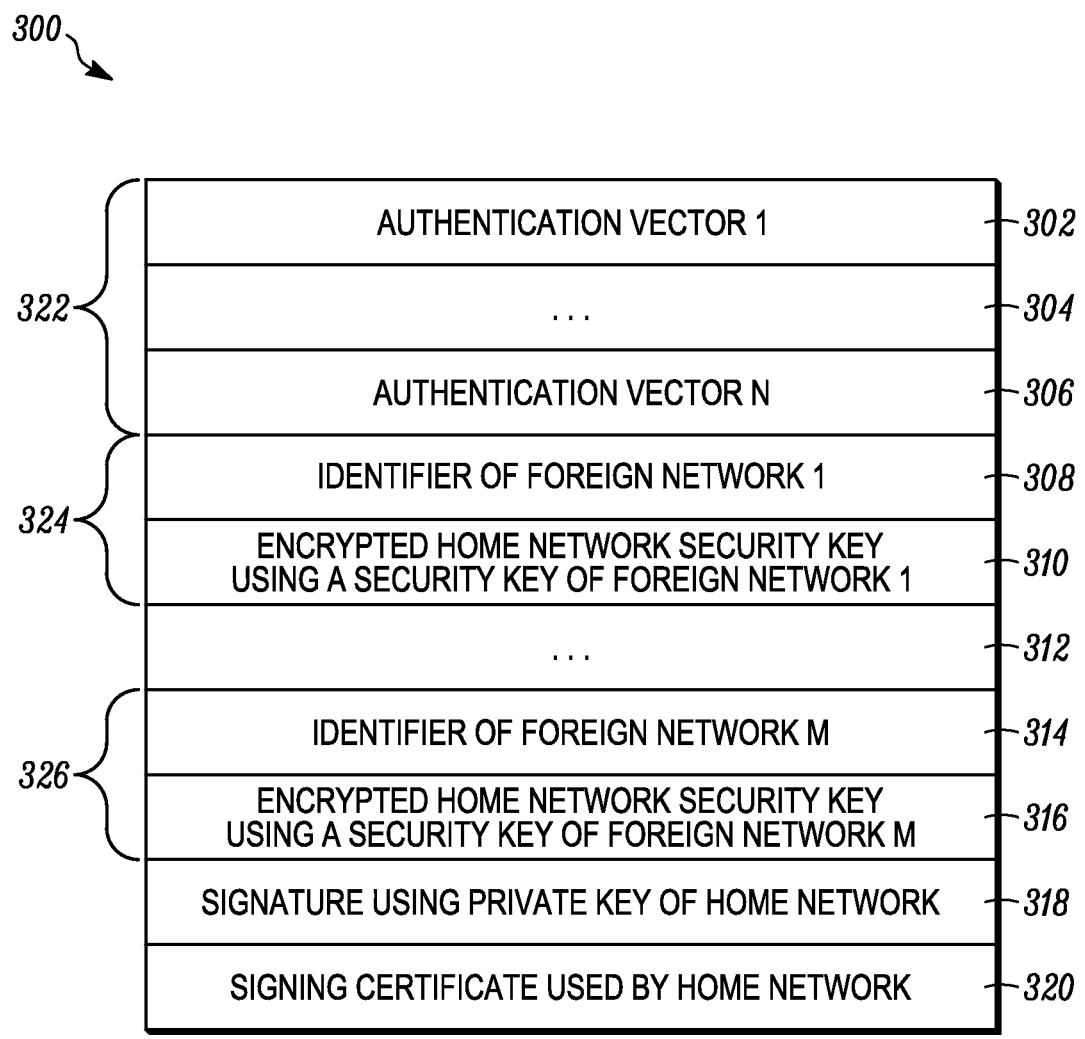
FIG. 3 is an authentication vector message structure in accordance with some embodiments.

Turning momentarily to FIG. 3, an authentication vector message structure 300 in accordance with some embodiments is shown. An authentication vector message is utilized to distribute authentication vectors in accordance with the present teachings. The authentication vector message structure 300 comprises an authentication vector block 322. The block 322 comprises N authentication vectors, 302 through 306. As used herein after, N stands for an integer, such as 1, 6, and 10. 304 represents any one of the N authentication vectors excluding the authentication vectors 302 and 306. The N authentication vectors may be encrypted as a single block or piece of data. Alternatively, each of the N authentication vectors is individually encrypted. The N authentication vectors are encrypted using a security key ($K_{home\_mme}$) of the wireless network (e.g., a home wireless network) that constructs the authentication vector message. For example, a symmetric key of AES-128 (Advanced Encryption Standard) protocol or other protocols of similar encryption strength may be used to encrypt the N authentication vectors. The N authentication vectors are arranged in sequential order from authentication vector 302 to authentication vector 306, and should be used sequentially.

The authentication vector message 300 further comprises M foreign network data blocks, 324 through 326. As used herein after, M stands for an integer, such as 1, 6, and 10. Integer M may be same as, or different from, integer N. 312 represents any one of the M foreign network data blocks excluding the foreign network data blocks 324 and 326. Each foreign network data block comprises an identifier field, such as 308 and 314, which contains a unique identifier of a foreign wireless network. For example, the identifiers 308 and 314 may be the Public Land Mobile Network (PLMN) identifiers as referenced in 3GPP TS 23.401 V10.2.1 (2011-01). Each foreign network data block further comprises an encrypted home security key ($K_{home\_mme}$) field, such as 310 and 316. Generally, $K_{home\_mme}$ is a symmetric security key of an MME of the home wireless network. $K_{home\_mme}$ is encrypted using a public key of the foreign wireless network that is identified by the corresponding identifier field. Alternatively, the home security key $K_{home\_mme}$ may be an asymmetric key pair, $K_{home\_mme\_public}$ and $K_{home\_mme\_private}$. In the alternate embodiment, the authentication vector block 322 is encrypted using the private key $K_{home\_mme\_private}$, and the encrypted home security key, such as 310 and 316, is the encrypted public key $K_{home\_mme\_public}$.

Additionally, the authentication vector message 300 comprises a signature field 318. The signature 318 is created using a private key of the home wireless network, corresponding to a digital certificate of the home wireless network indicated by a certificate field 320. In a LTE network, the private key of the home wireless network, and digital certificates of the home wireless network belong to a MME in the home wireless network. The certificate field 320 of the authentication vector message 300 contains the digital certificate, such as an X.509 certificate. Additionally, the certificate field 320 may include an entire chain of certificates of the home wireless network, a cross certificate with a trust bridge, or a certificate revocation list (CRL) from the trust bridge. A digital certificate or simple certificate is defined as an electronic document which uses a digital signature to bind a public key with an identity. Issued by a certification authority (CA), a digit al certificate generally contains a name of the certificate holder, a serial number, expiration dates, a copy of the certificate holder's public, and the digital signature of the CA so that a recipient can verify that the certificate is real.

In A particular embodiment of the present teachings, the certificate field 320 contains X.509 certificates, which are widely used and which conform to a tree structure. The topmost certificate of the tree structure is termed the root certificate, common root of trust, or trust bridge of the tree structure. A certificate authority issues multiple certificates in the form of the tree structure. All certificates of the certificate tree immediately below the root certificate inherit the trustworthiness of the root. Certificates further down the tree also depend on the trustworthiness of the intermediary certificates. Two certificates are termed to share or have a common root of trust if they can be traced to a single root certificate. For example, any two certificates in the tree of certificates can be traced to the top-most certificate of the tree. Accordingly, the two certificates have a common root of trust. Each branch of certificates on the tree is termed a trust domain.

Figure 7:
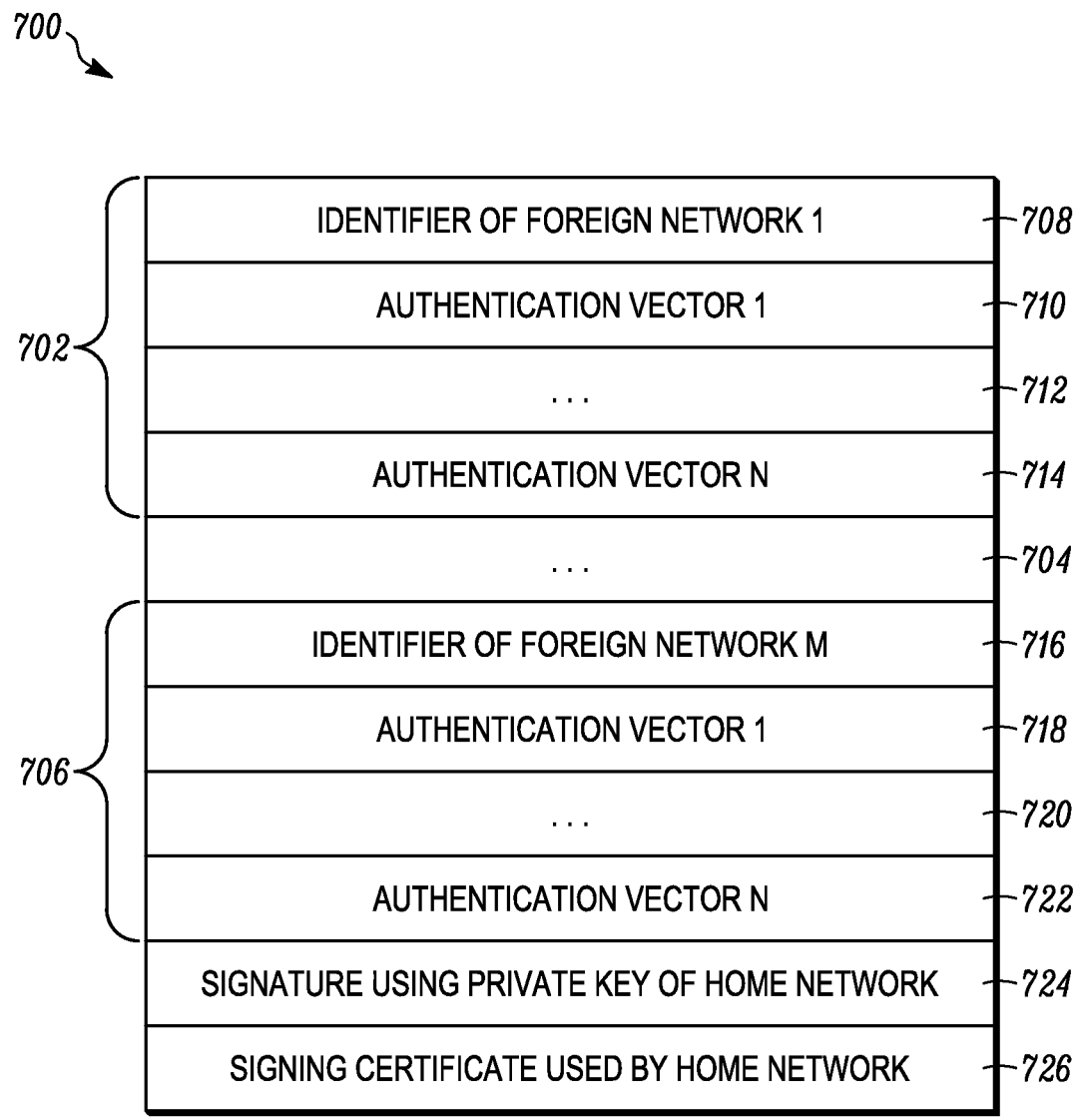
FIG. 7 is an authentication vector message structure in accordance with some embodiments.
Figure 8:
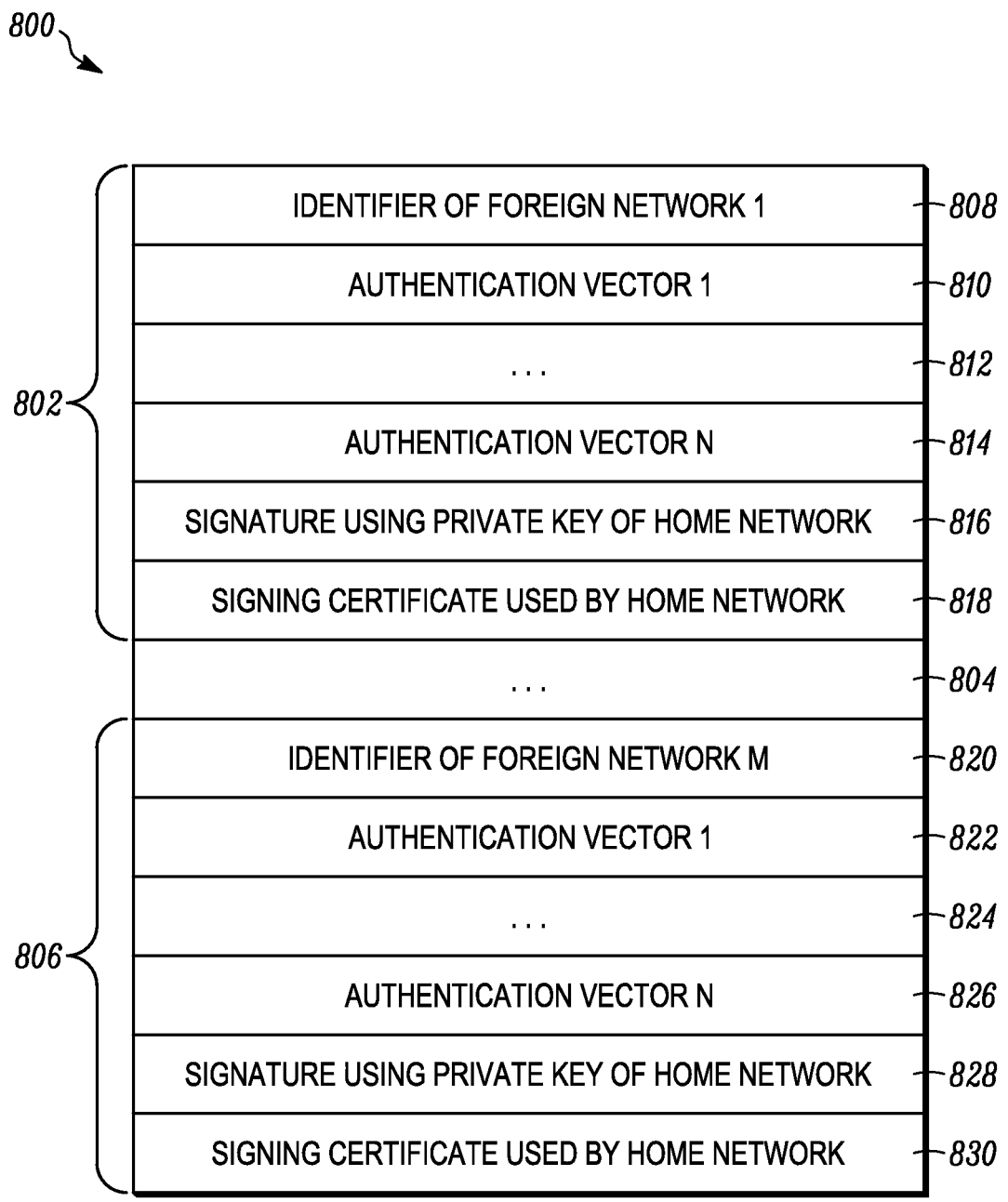
FIG. 8 is an authentication vector message structure in accordance with some embodiments.

Alternatively, an authentication vector message may be constructed as indicated in FIG. 7 and FIG. 8. Turning first to FIG. 7, an authentication vector message structure 700 in accordance with some embodiments is shown. The authentication vector message 700 comprises M foreign network data blocks, 702 through 706. 704 represents any one of the M foreign network data blocks excluding the foreign network data blocks 702 and 704. Each foreign network data block comprises an identifier field, such as 708 and 716, which contains a unique identifier of a foreign wireless network.

Each foreign network data block further comprises an authentication vector block which comprises N authentication vectors, such as 710 through 714 and 718 through 722. Each of the two authentication vectors 712 and 720 represents any one of the N authentication vectors inside an authentication vector block. Each block of authentication vectors is encrypted using a security key, such as a public key, of the corresponding foreign wireless network. For example, the block of authentication vectors, 710 through 714, is encrypted using a public key of the foreign wireless network, identified by the identifier field 708. In such a case, the foreign wireless network, identified by the identifier field 708, decrypts the encrypted authentication vectors, 710 through 714, using its corresponding private key.

Additionally, the authentication vector message 700 comprises a signature field 724. The signature 724 is created using a private key of the home wireless network, corresponding to a digital certificate of the home wireless network indicated by a certificate field 726. In a LTE network, the private key of the home wireless network, and digital certificates of the home wireless network belong to a MME in the home wireless network. The certificate field 726 of the authentication vector message 700 contains the digital certificate, such as an X.509 certificate. Additionally, the certificate field 726 may include an entire chain of certificates of the home wireless network, a cross certificate with a trust bridge, or a certificate revocation list (CRL) from the trust bridge.

Referring now to FIG. 8, an authentication vector message structure 800 in accordance with some embodiments is shown. The authentication vector message 800 comprises M foreign network data blocks, 802 through 806. 804 represents any one of the M foreign network data blocks excluding the foreign network data blocks 802 and 806. Each foreign network data block comprises an identifier field, such as 808 and 820, which contains a unique identifier of a foreign wireless network.

Each foreign network data block further comprises an authentication vector block which comprises N authentication vectors, such as 810 through 814 and 822 through 826. Each of the two authentication vectors 812 and 824 represents any one of the N authentication vectors inside the corresponding authentication vector block. Each authentication vector is encrypted using a security key, such as a public key, of the corresponding foreign wireless network. For example, the block of authentication vectors, 810 through 814, is encrypted using a public key of the foreign wireless network, identified by the identifier field 808. In such a case, the foreign wireless network, identified by the identifier field 808, decrypts the encrypted authentication vectors, 810 through 814, using its corresponding private key.

Additionally, each foreign network data block further comprises a signature field, such as 816 and 828. The signatures are created using a private key of the home wireless network, corresponding to a digital certificate of the home wireless network indicated by a certificate field, such as 818 and 830. In a LTE network, the private key of the home wireless network, and digital certificates of the home wireless network belong to a MME in the home wireless network. The certificate field, such as 818 and 830, contains the digital certificate, such as an X.509 certificate. Additionally, the certificate field, such as 818 and 830, may include an entire chain of certificates of the home wireless network, a cross certificate with a trust bridge, or a certificate revocation list (CRL) from the trust bridge. With this embodiment, a wireless device only needs to send a foreign network data block, rather than the entire authentication vector message, when the wireless device attempts to attach to the corresponding foreign wireless network.

Turning back to 216 of FIG. 2, after determining that the authentication vector message is to be constructed, the MME in the home wireless network configures and sets up the authentication vector message. Accordingly at 216, the MME in the home wireless network forms an authentication vector block (322 of FIG. 3) with N authentication vectors, and encrypts the authentication vector block using a security key of the MME in the home wireless network. The N authentication vectors are part of the authentication vectors that the MME in the home wireless network retrieved from an HSS at 206. Moreover, the N authentication vectors do not include the authentication vector that the MME in the home wireless network selected at 206. Alternatively, the MME in the home wireless network may retrieve these N authentication vectors from the HSS of the home wireless network at 216. In one particular embodiment of method 200, the N authentication vectors are encrypted as a single block or piece of data. In an alternate embodiment of method 200, each of the N authentication vectors is individually encrypted, and the individually encrypted N authentication vectors forms the authentication vector block of encrypted authentication vectors.

At 218, the MME in the home wireless network sets up a number of foreign network data blocks (such as 324 and 326 of FIG. 3). For each foreign network data block, the MME in the home wireless network sets the identifier field (such as 308 and 314 of FIG. 3) with an unique identifier of a foreign wireless network, and sets the encrypted home security key field with the encrypted home security key. The home security key is encrypted using a public key of the foreign wireless network which is identified by the identifier field. At 220, the MME in the home wireless network creates a digital signature using a private key of the MME in the home wireless network and a digital certificate, such as a X.509 certificate, of the MME in the home wireless network. The signature is set in the signature field (318 of FIG. 3). At 222, the MME in the home wireless network sets the certificate field (320 of FIG. 3) with the certificate of the MME in the home wireless network. Alternatively, the MME in the home wireless network may additionally set the certificate field with the entire chain of certificates of the MME in the home wireless network, cross certificate with a trust bridge, or a CRL list from the trust bridge. At 224, the MME in the home wireless network sends the constructed authentication vector message to the wireless device. The authentication vector message may be sent to the wireless device as part of an attach accept message to the wireless device.

In an alternate embodiment of method 200, the MME in the home wireless network does not construct and send an authentication vector message to the wireless device in response to an attach request message from the wireless device. Rather, the MME in the home wireless network constructs and sends an authentication vector message to the wireless device upon a specific request from the wireless device. For example, the wireless device indicates the request for authentication vectors when the wireless device sends an authentication response message, such as the authentication response message at 208. Another example, after receiving an attach accept message, the wireless device requests the MME in the home wireless network for a set of authentication vectors. This request can optionally specify one or more LTE networks for which the set of authentication vectors is intended in order to limit the number of foreign network data blocks (such as 324 and 326 in FIG. 3)

Figure 4:
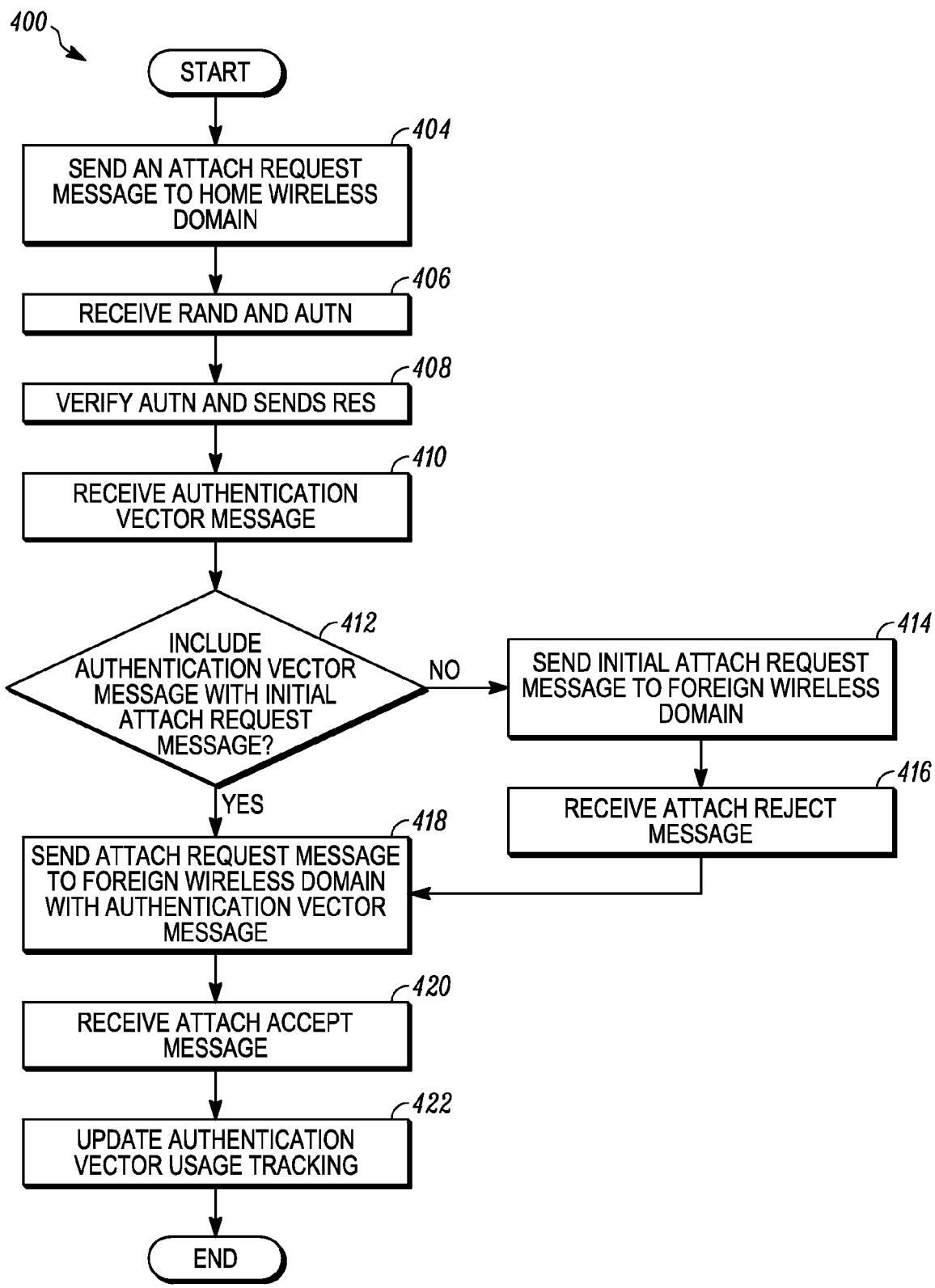
FIG. 4 is a logical flowchart illustrating a method in accordance with some embodiments.

Referring now to FIG. 4, a logical flow diagram illustrating a general method 400 performed by a wireless device within a 3GPP communication system is shown. In a particular embodiment of method 400, the wireless device is wireless device 110 of FIG. 1, a foreign wireless network of the wireless device is wireless network 104 of FIG. 1, and a home wireless network of the wireless device is wireless network 102 of FIG. 1. At 404, the wireless device sends an attach request message to an MME infrastructure device of the home wireless network of the wireless device.

Responsive to the attach request message, the MME in the home wireless network authenticates the wireless device using the standard AKA protocol. Under the AKA protocol, the MME in the home wireless network sends a random network challenge number (RAND), and a network authentication token (AUTN) to the wireless device. At 406, the wireless device receives the RAND and AUTN. At 408, the wireless device computes a sequence number using the RAND and AUTN, and determines whether the sequence number is in a correct range. One such computational algorithm is described in 3GPP TS 33.102 V10.0.0 (2010-12). The AUTN is regarded acceptable when the sequence number is in a correct range. If the AUTN is accepted, the wireless device computes a response (RES). 3GPP TS 33.102 V10.0.0 (2010-12) describes one way of how to compute the RES. The wireless sends the RES back to the MME in the home wireless network at 408.

In response to the RES sent by the wireless device at 408, the MME in the home wireless network constructs an authentication vector message, and sends authentication vector message, as part of an attach accept message, to the wireless device. At 410, the wireless device receives the authentication vector message. At 412, the wireless device attempts to attach to a foreign wireless network, and determines whether to include the authentication vector message in an initial or first attach request message to the foreign wireless network. If the wireless decides to include the authentication vector message in the initial attach request message at 412, the wireless device sends the initial attach request message with the authentication vector message to an infrastructure device, such as an MME, within the foreign wireless network, at 418. The foreign MME receives the authentication vector message, and authenticates the wireless device using one authentication vector contained in the authentication vector message. At 420, the wireless device receives an attach accept message from the foreign MME after the foreign MME successfully authenticates the wireless device using the standard 3GPP AKA protocol.

The wireless device tracks the usage of the authentication vectors contained in the authentication vector message. The usage tracking information indicates the authentication vectors that have been used by the wireless device in previous attachment to foreign wireless networks. In an embodiment, the authentication vectors are in sequential order, and should be used sequentially. When the wireless device sends the authentication vectors to a foreign wireless network, the wireless device also sends the usage tracking information. After the wireless device is successfully attached to a foreign wireless network, the wireless device updates the usage tracking information of the authentication vectors, at 422. The updated usage tracking information is then used the next time when the wireless device attempts to attach to a foreign wireless network. The wireless device discards the set of authentication vectors when the device receives a new authentication vector message upon a successful subsequent attachment to the home wireless network of the wireless device.

Turning back to 412, if the wireless device decides to not include the authentication vector message in the initial attach request message at 412, the wireless device sends the initial attach request message without the authentication vector message to the foreign MME, at 414. When the foreign MME fails to authenticate the wireless device in response to the initial attach request message and thereby fails to obtain a set of authentication vectors for the wireless device, the foreign MME sends an attach reject message to the wireless device. At 416, the wireless device receives the attach reject message. Responsive to the attach reject message, the wireless device sends a second or subsequent attach request message with the authentication vector message to the foreign MME at 418. In an alternate embodiment of method 400, the authentication vectors in the authentication vector message are individually encrypted and digitally signed. Accordingly, the wireless device sends only one authentication vector to the foreign MME at 418.

Figure 5:
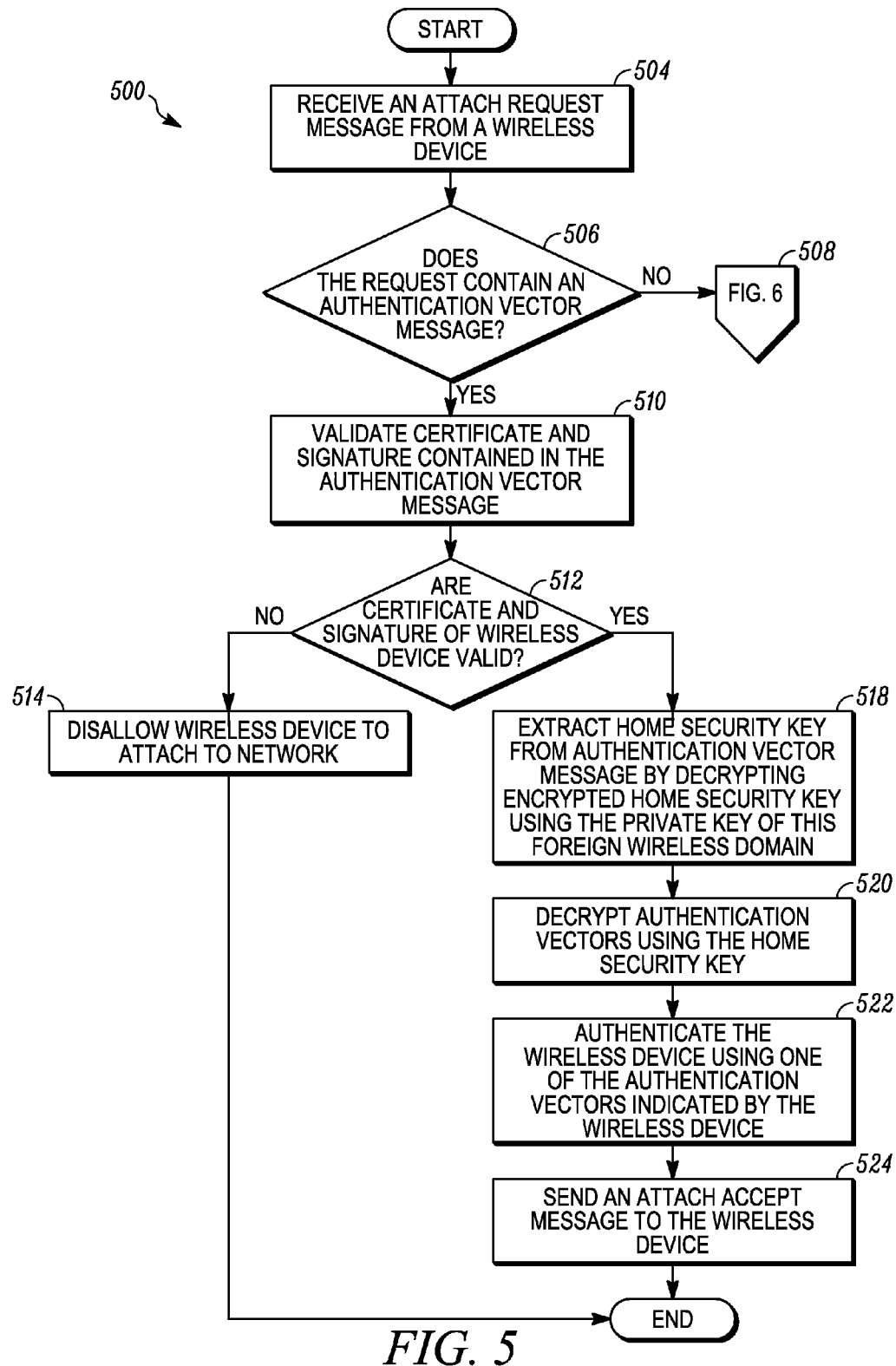
FIG. 5 is a logical flowchart illustrating a method in accordance with some embodiments.
Figure 6:
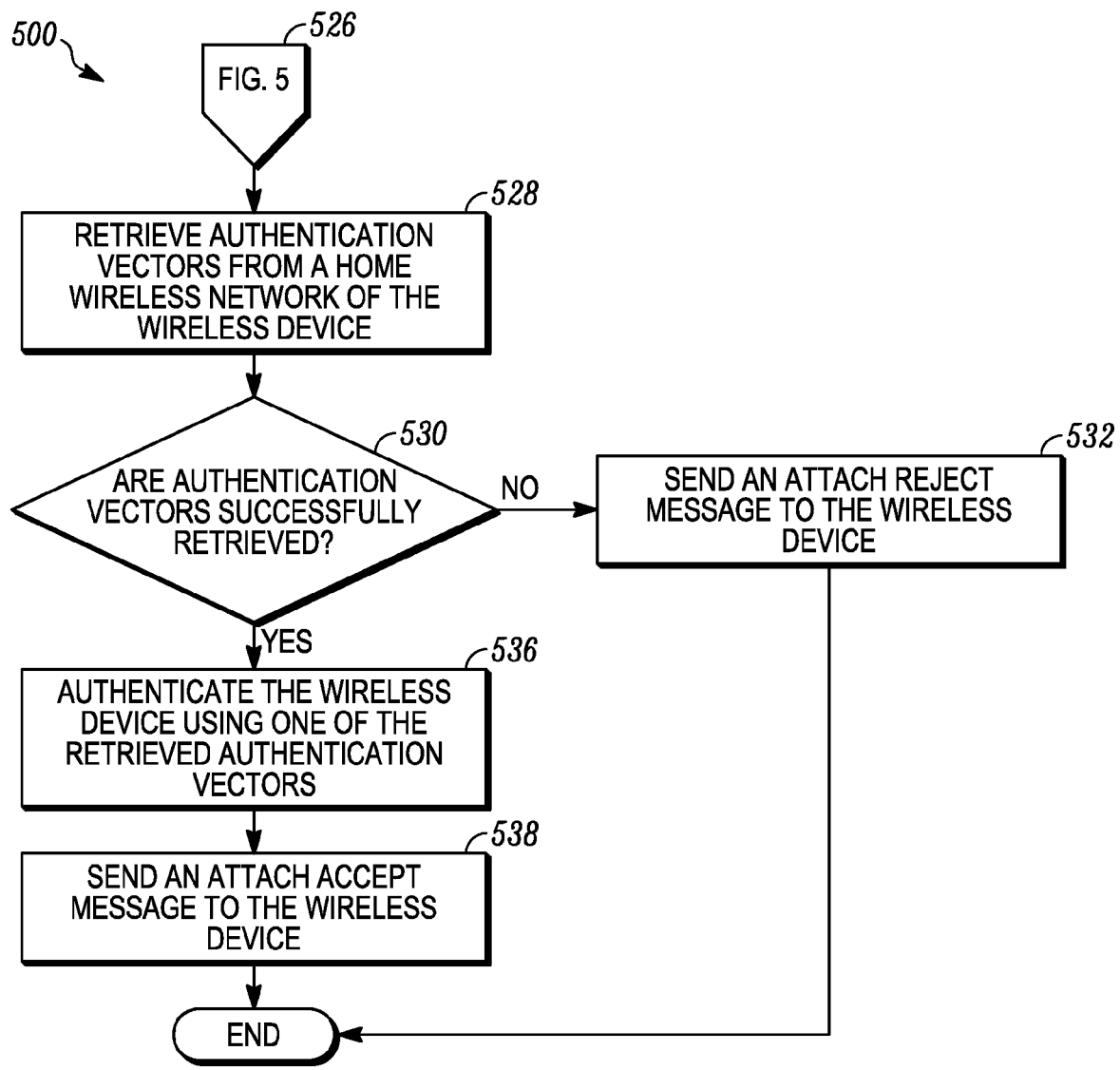
FIG. 6 is a logical flowchart illustrating a method in accordance with some embodiments.

FIGS. 5-6 illustrate a method 500 in accordance of some embodiments of the present teachings. Method 500 is performed by an infrastructure device in a foreign wireless network of a wireless device. In a particular embodiment of method 500, the foreign wireless network is wireless network 104 of FIG. 1, and the foreign infrastructure device is MME 108 of FIG. 1.

Referring in particular to FIG. 5, at 504, a foreign infrastructure device (e.g., the foreign MME) receives and examines an attach request message from a wireless device. In this illustrative implementation, the wireless device is wireless device 110 of FIG. 1, and a home wireless network of the wireless device is home wireless network 102 of FIG. 1. The foreign MME determines whether the attach request message contains an authentication vector message at 506. If the attach request message contains an authentication vector message, the foreign MME validates the certificate or certificates at 510, contained in the certificate field of the authentication vector message, by tracing the certificates to a common trust root with the foreign MME. If the certificate or certificates are verified successfully, the foreign MME then validates the signature, contained in the signature field of the authentication vector message, using the certificate or certificates and a public key of the home wireless network.

At 512, the foreign MME determines whether the signature and certificate or certificates in the authentication vector message are valid. If they are valid at 518, the foreign MME locates a foreign network data block in the authentication vector message using an identifier of the foreign MME. After a foreign network data block is identified, the foreign MME decrypts the encrypted home security key, contained in the home security key field of the foreign network data block, using a private key of the foreign MME, at 518. With the decrypted home security key, the foreign MME decrypts the authentication vector block of the authentication vector message, at 520. At 522, the foreign MME selects one authentication vector from the authentication vector block based on authentication vector usage tracking information sent by the wireless device. Thereafter, the foreign MME authenticates the wireless device using the selected authentication vector, and the standard 3GPP AKA protocol. At 524, the foreign MME sends an attach accept message to the wireless device after the wireless device is successfully authenticated.

Turning back to 512, if the signature or certificate in the authentication vector message is invalid, the foreign MME disallows the wireless device to attach to the foreign wireless network. In other words, the wireless device is not allowed to use networking services provided by the foreign wireless network. After 514, execution of method 500 transitions to 516.

Turning now back to 506, if the attach request message does not contain an authentication vector message in the attach request message, execution of method 500 transitions to 508, which is further illustrated by reference to FIG. 6. Turning now to FIG. 6, at 526, method 500 continues from 508 of FIG. 5. At 528, using the standard 3GPP S6a interface, the foreign MME attempts to retrieve authentication vectors, which are for authenticating the wireless device to the foreign wireless network, from the home wireless network of the wireless device. At 530, the foreign MME determines whether it successfully retrieved authentication vectors at 528. If the foreign MME failed to retrieve authentication vectors at 528, the foreign MME sends an attach reject message to the wireless device at 532, which may prompt the wireless device to send a subsequent attach request message with the authentication message in accordance with the teachings herein.

Turning back to 530, if the foreign MME successfully retrieved authentication vectors at 528, the foreign MME authenticates the wireless device using one of the retrieved authentication vectors, at 536. Upon successful authentication of the wireless device at 536, the foreign MME sends an attach accept message to the wireless device, at 538.

Persons of skill in the art will understand that this disclosure may be extended to other embodiments than those specifically disclosed herein. In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article or apparatus that comprises, has, includes, contains a list of elements does not include only those elements but may include other elements not expressly listed or inherent to such process, method, article, or apparatus. An element proceeded by "comprises . . . a", "has . . . a", "include . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed. Also, the sequence of steps in a flow diagram or elements in the claims, even when preceded by a letter does not imply or require that sequence.

Moreover, an embodiment can be implemented as a computer-readable storage medium having computer readable code stored thereon for programming a computer (e.g., comprising a processor) to perform a method as described and claimed herein. Examples of such computer-readable storage medium include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for obtaining authentication credentials for attaching a wireless device to a foreign wireless domain in a 3rd Generation Partnership Project (3GPP) communication system, the method comprising:

receiving, by an infrastructure device of a 3GPP communication system, an attach request message from a wireless device, wherein the wireless device and the infrastructure device are within a home wireless domain of the wireless device;

responsive to the attach request message, authenticating, by the infrastructure device, the wireless device and retrieving a set of authentication vectors, wherein the authentication vectors are for authenticating the wireless device to a foreign wireless domain of the 3GPP communication system using a standard 3GPP authentication mechanism;

encrypting, by the infrastructure device, the set of authentication vectors using a first security key of the home wireless domain;

encrypting, by the infrastructure device, the first security key using a second security key of the foreign wireless domain; and sending by the infrastructure device, the encrypted set of authentication vectors and the encrypted first security key to the wireless device.

2. The method of claim 1, wherein the infrastructure device within the home wireless domain comprises a mobility management entity (MME), and the method further comprising the MME digitally signing the encrypted set of authentication vectors and the encrypted first security key using a private key of the MME.

3. The method of claim 1 further comprising receiving a request for authentication vectors from the wireless device, and sending the encrypted set of authentication vectors and the encrypted first security key to the wireless device in response to the request for authentication vectors.

4. The method of claim 1, wherein the first security key is a private key of the home wireless domain and the second security key is a public key of a mobility management entity in the foreign wireless domain.

5. The method of claim 1, wherein:
the home wireless domain is a LTE (Long Term Evolution) domain;
the foreign wireless domain is a different LTE domain; and
the standard 3GPP authentication mechanism uses an Authentication and Key Agreement protocol.

6. The method of claim 1 further comprising sending at least one certificate to the wireless device with the encrypted set of authentication vectors and the encrypted first security key.

7. The method of claim 6, wherein the at least one certificate comprises at least one of a certificate of the infrastructure device, a certificate chain from the infrastructure device to a trust bridge, a cross certificate with the trust bridge, or a certificate revocation list from the trust bridge.

8. A method for obtaining authentication credentials for attaching a wireless device to a foreign wireless domain in a 3rd Generation Partnership Project (3GPP) communication system, the method comprising:
receiving, by an infrastructure device of a 3GPP communication system, an attach request message from the wireless device, wherein the attach request message includes an encrypted first security key of a home wireless domain of the wireless device and a set of encrypted authentication vectors for authenticating the wireless device using a standard 3GPP authentication mechanism, wherein the set of encrypted authentication vectors is generated by the home wireless domain, and wherein the infrastructure device is within a foreign wireless domain;
decrypting, by the infrastructure device, the encrypted first security key using a second security key of the infrastructure device;
decrypting, by the infrastructure device, the set of encrypted authentication vectors using the first security key; and
authenticating, by the infrastructure device, the wireless device using at least one authentication vector in the set of authentication vectors.

9. The method of claim 8 further comprising the infrastructure device performing, prior to receiving the attach request message:
receiving an initial attach request message from the wireless device without the set of authentication vectors;
attempting and failing to obtain the set of authentication vectors from an infrastructure device in the home wireless domain; and
sending an attach reject message to the wireless device in response to the initial attach request message.

10. The method of claim 8, wherein the encrypted set of authentication vectors and the encrypted first security key comprises a digital signature of an infrastructure device in the home wireless domain, the method further comprising verifying the digital signature prior to decrypting the encrypted first security key.

11. The method of claim 10, wherein the digital signature is generated using a private key of a mobility management entity in the home wireless domain.

12. The method of claim 8, wherein:
the infrastructure device comprises a mobility management entity (MME); and
the second security key comprises a private key of the MME.

13. A method for obtaining authentication credentials for attaching a user equipment to a foreign wireless network in a 3rd Generation Partnership Project (3GPP) communication system, the method comprising:
sending, by a user equipment associated with a home wireless network of a 3GPP communication system, an attach request message and a request for a set of authentication vectors to a mobility management entity (MME) within the home wireless network;
upon being authenticated to the home wireless network, receiving, by the user equipment, an encrypted set of authentication vectors and an encrypted first security key of the home wireless network, wherein the set of authentication vectors are encrypted using the first security key; and
sending, by the user equipment, an attach request message to a MME within a foreign wireless domain of the 3GPP system.

14. The method of claim 13, wherein the attach request message sent to the MME within the foreign wireless network comprises the encrypted set of authentication vectors and the encrypted first security key, and wherein the set of authentication vectors are for authenticating the user equipment to the foreign wireless network using an Authentication and Key Agreement Protocol.

15. The method of claim 13 further comprising:
receiving an attach reject message in response to the attach request message sent to the MME within the foreign wireless network, upon the MME within the foreign wireless network failing to obtain the set of authentication vectors from the home wireless network; and
responsive to the attach reject message, sending a subsequent attach request message to the MME within the foreign wireless network that includes the encrypted set of authentication vectors and the encrypted first security key.

* * * * *

UNITED STATES PATENT AND TRADEMARK OFFICE
CERTIFICATE OF CORRECTION

PATENT NO. : 8,699,709 B2  
APPLICATION NO. : 13/178650  
DATED : April 15, 2014  
INVENTOR(S) : Shanthi Thomas et al.

Page 1 of 1

It is certified that error appears in the above-identified patent and that said Letters Patent is hereby corrected as shown below:

ON THE TITLE PAGE:

On Page 2, in Item (56), under "OTHER PUBLICATIONS", in Column 1, Line 4, delete "Authenticationof" and insert -- "Authentication of --, therefor.

On Page 2, in Item (56), under "OTHER PUBLICATIONS", in Column 1, Line 9, delete "E-Goverment" and insert -- E-Government --, therefor.

IN THE SPECIFICATION:

In Column 11, Line 4, delete "FIG. 3)" and insert -- FIG.3). --, therefor.

IN THE CLAIMS:

In Column 14, Line 59, in Claim 1, delete "sending" and insert -- sending, --, therefor.

Signed and Sealed this  
Tenth Day of May, 2016

Michelle K. Lee  
*Director of the United States Patent and Trademark Office*